(12) United States Patent
Cunningham et al.

(10) Patent No.: US 10,065,618 B2
(45) Date of Patent: Sep. 4, 2018

(54) VEHICLE BRAKING SYSTEM AND METHOD

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 392 days.

(21) Appl. No.: 13/862,120

(22) Filed: Apr. 12, 2013

(65) Prior Publication Data
US 2014/0306513 A1 Oct. 16, 2014

(51) Int. Cl.
| B60T 13/58 | (2006.01) |
| B60T 8/17 | (2006.01) |
| B60T 8/44 | (2006.01) |
| B60T 17/02 | (2006.01) |
| F02M 35/10 | (2006.01) |

(52) U.S. Cl.
CPC .............. B60T 13/58 (2013.01); B60T 8/17 (2013.01); B60T 8/442 (2013.01); B60T 17/02 (2013.01); F02M 35/10229 (2013.01); *B60T 2201/03* (2013.01); *F02D 2250/41* (2013.01)

(58) Field of Classification Search
CPC . B60T 13/58; B60T 17/02; B60T 8/17; B60T 8/442; B60T 2201/03
USPC .......................................................... 303/4
See application file for complete search history.

(56) References Cited

U.S. PATENT DOCUMENTS

| 4,208,872 | A | * | 6/1980 | Shimizu | B60T 13/245 60/280 |
| 4,291,612 | A | * | 9/1981 | Day | B60T 13/52 137/115.14 |
| 4,848,848 | A | * | 7/1989 | Klein | B60T 8/4258 303/114.3 |
| 5,607,209 | A | * | 3/1997 | Narita | B60T 8/17616 303/122.11 |
| 5,947,235 | A | | 9/1999 | Schaefer | |
| 6,033,038 | A | | 3/2000 | Kulkarni et al. | |
| 6,324,845 | B1 | * | 12/2001 | Fulks | B60T 13/52 60/397 |
| 6,659,572 | B2 | | 12/2003 | Bond, III et al. | |
| 6,782,796 | B2 | | 8/2004 | Nakano | |

(Continued)

FOREIGN PATENT DOCUMENTS

CN 102398583 A 4/2012

OTHER PUBLICATIONS

State Intellectual Property Office of the People's Republic of China, Office Action and Search Report Issued in Application No. 201410148948.1, dated Aug. 18, 2017, 9 pages. (Submitted with Partial Translation).

*Primary Examiner* — Robert Siconolfi
*Assistant Examiner* — San M Aung
(74) *Attorney, Agent, or Firm* — Julia Voutyras; McCoy Russell LLP

(57) ABSTRACT

A system and method for increasing brake line pressure after brake booster vacuum has been exhausted is presented. In one example, brake line pressure is increased at a same rate after brake booster vacuum is exhausted as before brake booster vacuum is exhausted so that a driver experiences a continuous braking force.

20 Claims, 5 Drawing Sheets

(56) References Cited

U.S. PATENT DOCUMENTS

| | | | | |
|---|---|---|---|---|
| 8,322,800 | B2* | 12/2012 | Anderson | B60T 13/57 |
| | | | | 188/357 |
| 2003/0052533 | A1* | 3/2003 | Miwa | B60T 8/3275 |
| | | | | 303/114.3 |
| 2005/0218716 | A1* | 10/2005 | Collins | B60T 13/72 |
| | | | | 303/115.3 |
| 2006/0158028 | A1* | 7/2006 | Ichikawa | B60K 6/543 |
| | | | | 303/114.3 |
| 2007/0284937 | A1* | 12/2007 | Deiml | B60K 6/48 |
| | | | | 303/115.3 |
| 2010/0193311 | A1* | 8/2010 | Calnek | B60T 13/57 |
| | | | | 188/357 |
| 2012/0049615 | A1* | 3/2012 | Tomida | B60T 13/20 |
| | | | | 303/4 |
| 2012/0074770 | A1* | 3/2012 | Lee | B60T 8/172 |
| | | | | 303/20 |
| 2013/0000296 | A1 | 1/2013 | Crombez | |

* cited by examiner

VEHICLE BRAKING SYSTEM AND METHOD

BACKGROUND/SUMMARY

Vacuum may be used to assist a driver applying vehicle brakes. The vacuum operates on a diaphragm that helps to move a rod that is linked to a brake pedal and that increases hydraulic pressure in brake lines to apply vehicle brakes. The vacuum acts as a force over the area of the diaphragm to assist the driver applying the brakes. Consequently, if the vacuum is a deeper vacuum (e.g., lower pressure), additional force may be applied to the diaphragm and assist the driver. As a result, the braking force may be increased as the vacuum amount increases.

However, engine displacements are being reduced in an effort to reduce fuel consumption. Smaller displacement engines may have lower frictional losses and they may operate more frequently with less pumping losses than larger displacement engine that are operated at part throttle conditions. However, it may be more difficult to provide lower vacuum levels and large amounts of vacuum with a smaller displacement engine. Consequently, a driver of a vehicle having a smaller displacement engine may apply brakes and receive vacuum assistance such that braking assistance is available to provide only a portion of a desired or requested braking force during vehicle braking. If the driver attempts to increase braking force via further depressing the brake pedal, the driver may notice that less braking force is applied as brake pedal force increases. Thus, the driver may notice that braking force is not increasing at a same rate as when vacuum is available and that the brake pedal feel has become stiffer. Such conditions may degrade a person's driving experience and impressions of the vehicle.

The inventors herein have recognized the above-mentioned disadvantages and have developed a method for applying vehicle brakes, comprising: increasing a brake line fluid pressure in response to brake pedal force at a first rate while brake booster working chamber vacuum is a threshold pressure away from atmospheric pressure, and increasing the brake line fluid pressure at the first rate while brake booster vacuum is within the threshold pressure of atmospheric pressure.

By increasing brake line fluid pressure proportionate to brake pedal force whether or not vacuum is available to a brake booster working chamber, it may be possible to improve a driver's perception of vehicle brake application. For example, brake line fluid pressure may increase at a first rate with respect to brake pedal force when vacuum is available to a brake booster. If additional vacuum is not available as brake pedal force continues to increase, a hydraulic pump may be activated and its output may be adjusted to increase brake line fluid pressure at the first rate so that the absence of additional vacuum is not as noticeable to the driver. In this way, an increase in braking force proportional to brake pedal force may be maintained even in the absence of additional brake booster vacuum.

The present description may provide several advantages. In particular, the approach may provide an improved driving experience via maintain an expected rate of brake application even in the presence of a limited amount of brake booster vacuum. Further, the approach may allow the engine to operate more efficiently since the engine may not have to be transitioned to a vacuum generating mode when brake system vacuum is low. Further still, the approach may make the presence of stiff brake pedal feel less noticeable to a driver.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
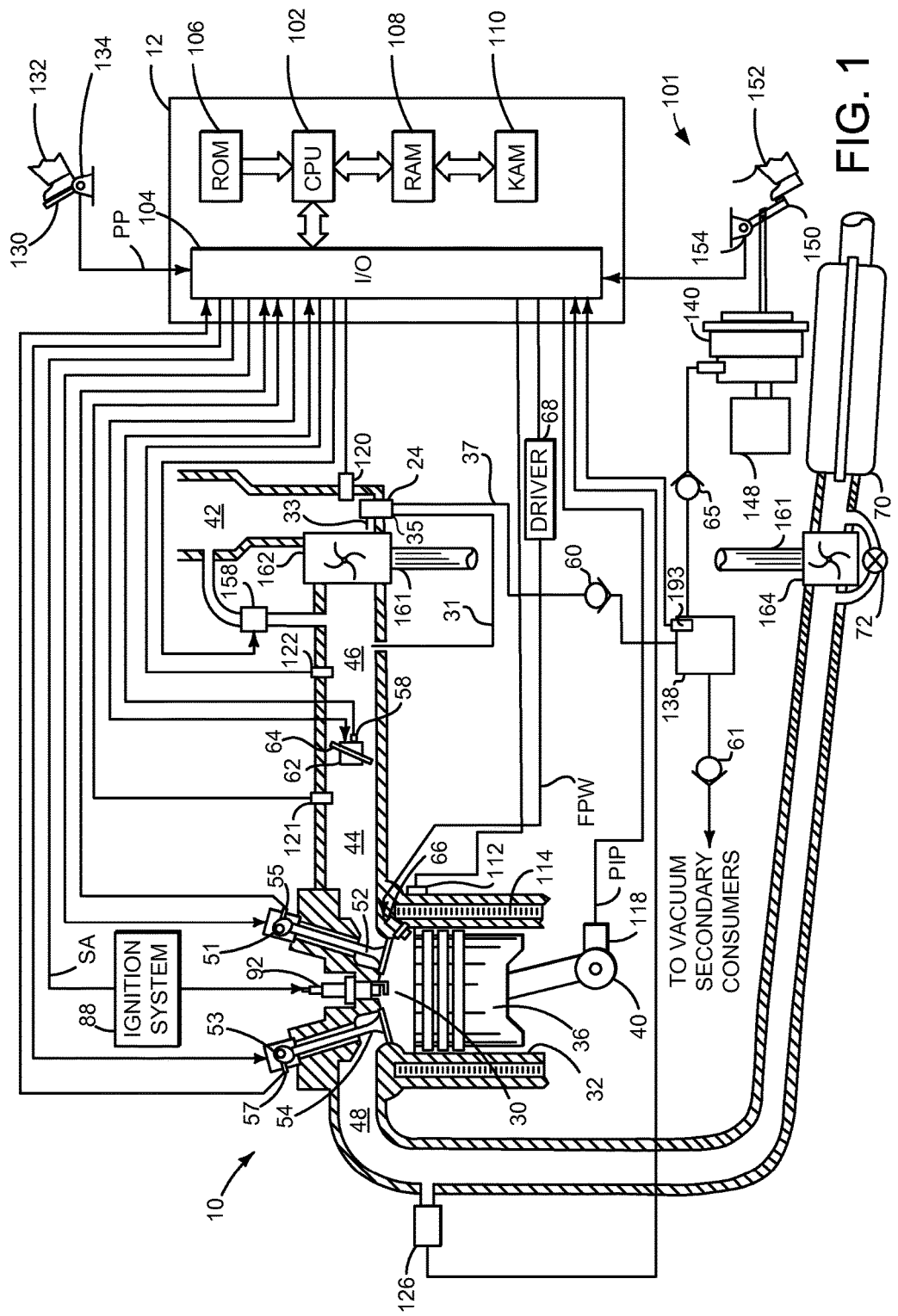
FIG. 1 shows a schematic depiction of an engine and a portion of a braking system.
Figure 2:
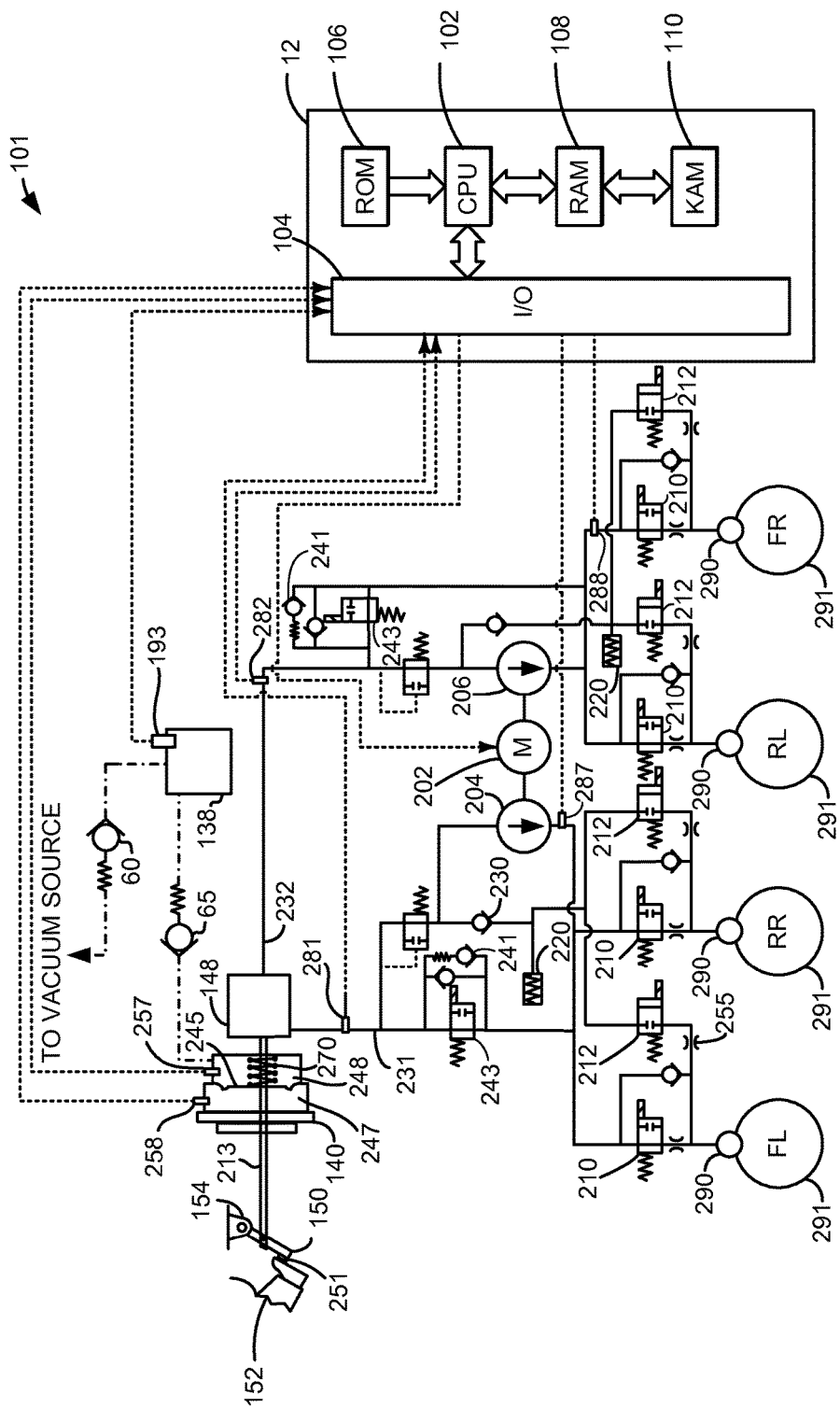
FIGS. 2 and 3 show example vehicle braking systems where the method of FIG. 6 may be applied to operate vehicle brakes.
Figure 3:
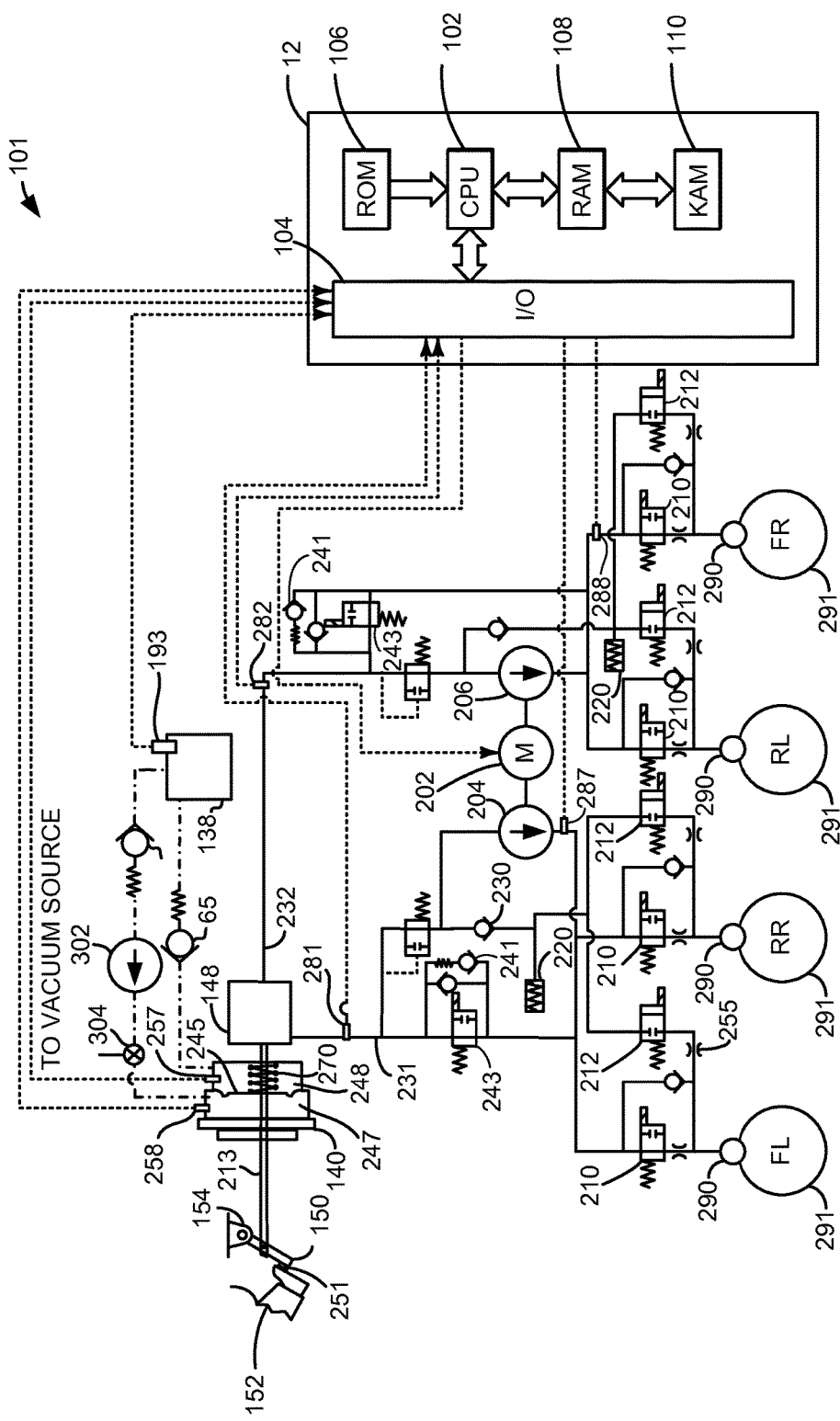
Figure 4:
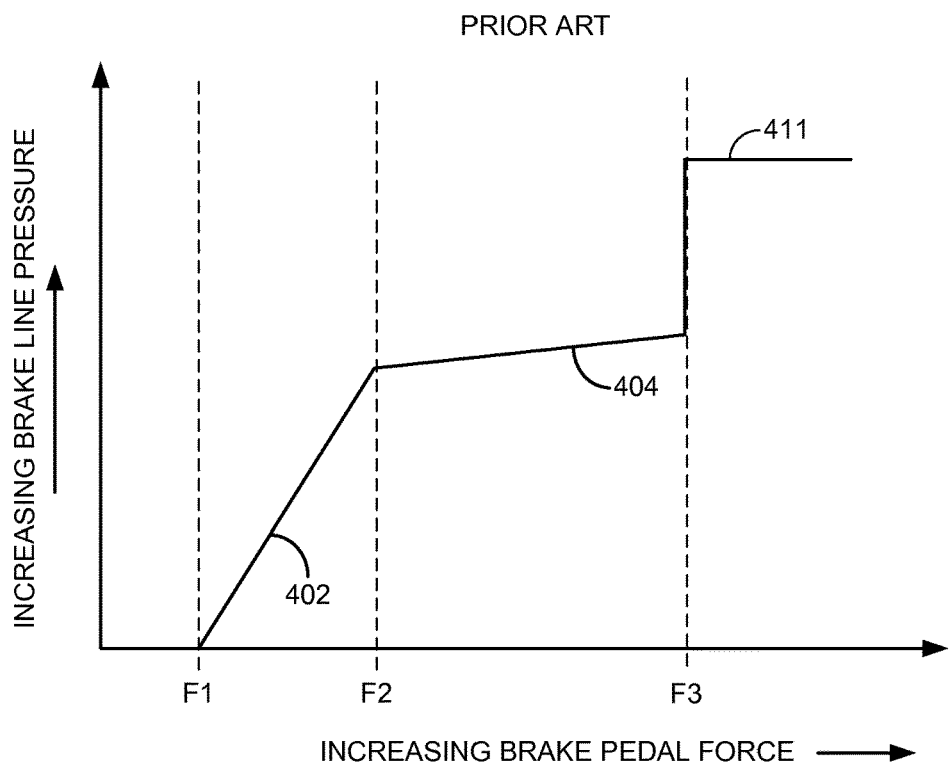
FIG. 4 shows an example plot of operating characteristics for a prior art approach for applying vehicle brakes.
Figure 5:
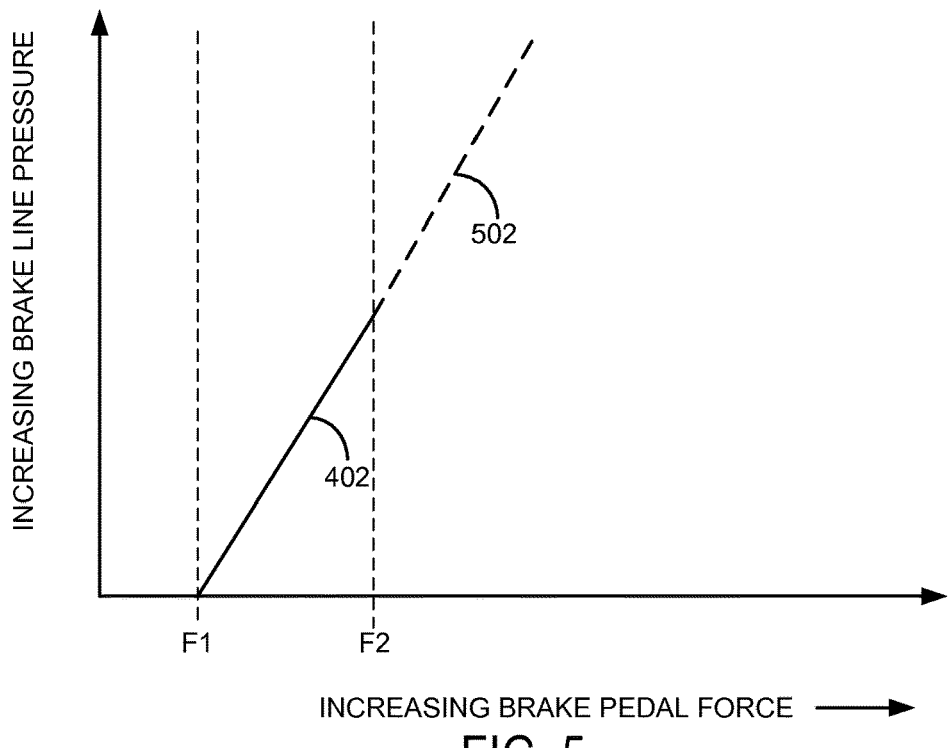
FIG. 5 shows an example plot of operating characteristics for applying vehicle brakes via the method of FIG. 6.
Figure 6:
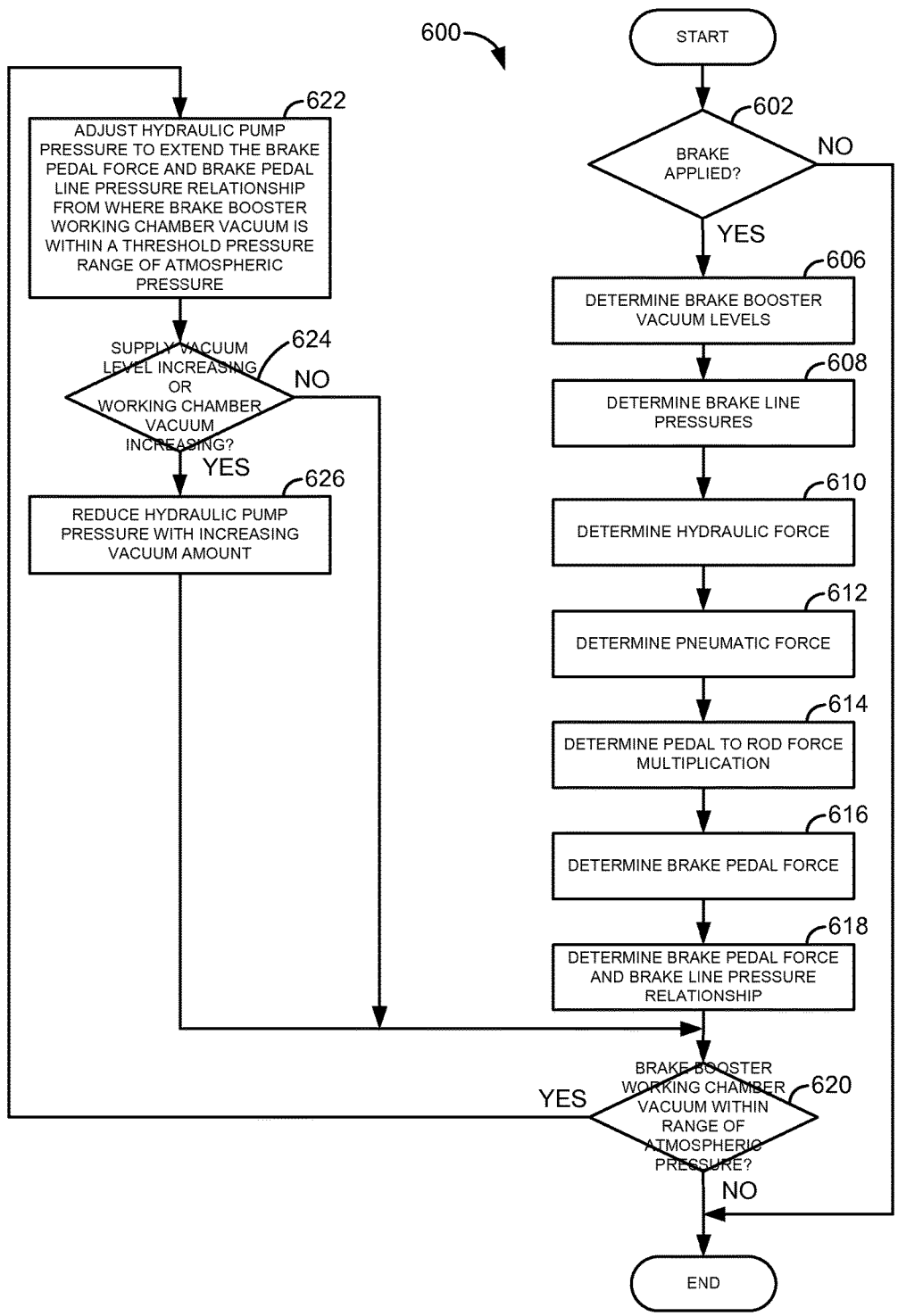
FIG. 6 shows an example method for operating vehicle brakes.

The present description is related to improving vehicle brake operation. FIG. 1 shows one example system for providing vacuum for a vehicle. FIGS. 2 and 3 show more detailed views of example vehicle braking systems. FIG. 4 shows a plot of operating characteristics of a prior art approach for applying vehicle brakes. FIG. 5 shows a plot of operating characteristics of the present approach for applying vehicle brakes. Finally, a method for applying vehicle brakes is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Compressor 162 draws air from air intake passage 42 to supply boost chamber 46. Exhaust gases spin turbine 164 which is coupled to compressor 162 via shaft 161. Compressor bypass valve 158 may be electrically operated via a signal from controller 12. Compressor bypass valve 158 allows pressurized air to be circulated back to the compressor inlet to limit boost pressure. Similarly, waste gate actuator 72 allows exhaust gases to bypass turbine 164 so that boost pressure can be controlled under varying operating conditions.

Vacuum is supplied to vehicle systems via vacuum providing device 24. Compressor 162 provides compressed air as a motive fluid via converging section duct 31 to converging section 35 of vacuum providing device 24 (e.g., an ejector). The motive fluid is combined with air from vacuum reservoir 138 via vacuum port duct 37 and check valve 60. Check valve 60 allows flow when the pressure produced via the ejector within vacuum port duct 37 is lower than the pressure within reservoir 138. Mixed air exits at diverging section 33. In some examples, vacuum reservoir 138 may be referred to as a vacuum system reservoir since it can supply vacuum throughout the vacuum system and since brake booster 140 may contain a vacuum reservoir too. Pressure in reservoir 138 may be monitored via vacuum reservoir pressure sensor 193. Vacuum system reservoir 138 provides vacuum to brake booster 140 via check valve 65. Check valve 65 allows air to enter vacuum system reservoir 138 from brake booster 140 and substantially prevents air from entering brake booster 140 from vacuum system reservoir 138. Vacuum system reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 limits air flow from secondary vacuum consumers (e.g., vacuum consumers other than the vehicle braking system) to vacuum system reservoir 138. Brake booster 140 may include an internal vacuum reservoir, and it may amplify force provided by foot 152 via brake pedal 150 to master cylinder 148 for applying vehicle brakes (not shown). Brake booster 140 and brake pedal 150 are part of vehicle braking system 101.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

In some examples, the engine may be coupled to an electric motor/battery system in a hybrid vehicle. The hybrid vehicle may have a parallel configuration, series configuration, or variation or combinations thereof. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIG. 2, a first example braking system where the method of FIG. 6 may be applied is shown. The braking system 101 of FIG. 2 may be included with the engine shown in FIG. 1. Hydraulic lines are shown solid, electrical connections are shown as dashed, and pneumatic connections are shown as dash-dot.

Braking system 101 includes a brake pedal 150 and a brake position sensor 154. In some examples, brake system 101 may also include a brake pedal force sensor 251. Brake pedal 150 may be operated by foot 152 to move rod 213. Foot 152 may be assisted by brake booster 140 to urge rod 213 to pressurize fluid in master cylinder 148 such that pressure in first brake line 231 and second brake line 232 increases when brake pedal 150 is depressed. Brake booster 140 includes a diaphragm 245 which is coupled to rod 213 and upon which vacuum applies force to pressurize oil in master cylinder 148. Brake booster 140 includes a working chamber 247, a vacuum chamber 248, and a return spring 270. In this example, working chamber 247 selectively receives air from a high pressure source being atmospheric pressure. When the brake pedal is depressed, pressure increases in working chamber 247 as vacuum is displaced with ambient air. Pressure sensor 258 senses pressure in working chamber 247. Pressure sensor 257 senses pressure in vacuum chamber 248.

Vacuum reservoir 138 supplies vacuum to brake booster 140 via check valve 65. Pressure in vacuum reservoir 138 is sensed via pressure sensor 193. In some examples, vacuum reservoir 138 may be incorporated into brake booster 140. Vacuum is supplied to vacuum reservoir 138 via check valve 60. Vacuum is supplied to check valve 60 via the engine intake manifold or a device such as an ejector.

The numerous hydraulic valves shown in FIG. 2 provide the many purposes of the brake system. When the valves are in their default positions, the system works as if there is no electronic control. When the valves and motors are actuated, it provides the ability to apply and release hydraulic pressure to the wheels or groups of wheels to accomplish many purposes including optimized braking and fraction control. Master cylinder 148 may supply pressurized oil to brakes 290 for stopping rotation of wheels 291. Normally open valves 210 and normally closed valves 212 control the flow of pressurized fluid from master cylinder 148 and/or hydraulic pumps 204 and 206. In particular, normally open valves 210 and normally closed valves 212 can isolate output from hydraulic brake pumps 204 and 206 to master cylinder 148 when hydraulic pumps 204 and 206 are operating. Hydraulic pumps 204 and 206 are operated by motor 202, and motor 202 is controlled by controller 12. The output pressure of pumps 204 and 206 may be monitored via optional pressure sensors 287 and 288. Orifices 255 limit pressure changes in the system and accumulators 220 allow pressure in brakes to be relieved when normally closed valves upstream of the accumulators are closed. Check valves 230 limit the flow between master cylinder 148 and hydraulic pumps 204 and 206. The output pressure of master cylinder 148 may be monitored via pressure sensors 281 and 282. Check valves 241 prevent fluid from flowing from hydraulic pumps 204 and 206 to master cylinder 148. Normally closed flow control valves 243 may be opened when vacuum in working chamber 247 of brake booster 140 is depleted and brake pedal application force is increasing so that hydraulic pumps 204 and 206 may increase pressure of fluid supplied to brakes 290. The front left vehicle wheel is designated FL, the front right wheel is designated FR, the right rear wheel is designated RR, and the rear left wheel is designated RL.

Referring now to FIG. 3, a second example vehicle braking system is shown. The second vehicle braking system is identical to the vehicle braking system shown in FIG. 2 except the system of FIG. 3 includes a vacuum pump 302, check valve 305, and control valve 304. The components of FIG. 3 that are the same as the components shown in FIG. 2 are labeled with the same numerical identifiers.

The vehicle braking system of FIG. 3 includes a vacuum pump or a compressor 302 that exhausts air into the working side 247 of brake booster 140. By increasing pressure in working side 247 to a pressure greater than atmospheric pressure, additional force may be applied to rod 213 to assist foot 152 applying brakes 290. Thus, in this example, working chamber 247 selectively receives air from a high pressure source being output from a pump or compressor. Valve 304 allows air to flow from pump 302 into brake booster 140 or to atmosphere depending whether or not brake pedal 150 has been applied. In this way, the braking system of FIG. 3 may apply even more assistance to foot 152 than the system of FIG. 2. Valve 304's function is to selectively apply pressure to the working chamber 247. Air pressure may be stored in the volume between pump 302 and valve 304. Valve 304 may be either controlled by an electronic control module or be mechanically controlled based on brake pedal force. Check valve 305 is positioned between vacuum pump 302 and vacuum reservoir 138.

Thus, the system of FIGS. 1-3 provides for a system for applying vehicle brakes, comprising: vehicle brakes; a brake pedal; a vacuum brake booster coupled to the brake pedal and in fluidic communication with the vehicle brakes; a hydraulic brake booster in fluidic communication with the vehicle brakes; and a controller including executable instructions stored in non-transitory memory to increase output from the hydraulic brake pump based on a rate the vacuum brake booster assists increasing brake line fluid pressure in response to applying the brake pedal. The rate vacuum brake booster assists increasing brake line fluid pressure is based on the slope of brake line fluid pressure versus brake pedal application force.

In some examples, the system includes where output from the hydraulic brake pump is increased in response to a brake booster working chamber vacuum level being within a threshold pressure of atmospheric pressure. The system further comprises additional instructions to reduce output from the brake booster vacuum in response to increasing vacuum in a vacuum reservoir. The system further comprises additional instructions to estimate brake pedal force from hydraulic force, pneumatic force, and spring force. The system further comprises additional instructions to estimate the rate the vacuum brake booster assists increasing brake line fluid pressure. The system further comprises a brake pedal force sensor, and where output from the hydraulic brake pump is adjusted in response to output from the brake pedal force sensor.

Referring now to FIG. 4 an example plot of operating characteristics of a prior art approach for applying vehicle brakes. The X axis represents brake pedal application force and brake pedal application force increases in the direction of the X axis arrow. The Y axis represents brake line pressure and brake line pressure increases in the direction of the Y axis arrow. Vertical markers F0-F2 show brake pedal application forces of interest. Further, vacuum available to the brake booster is a constant level and not limited in amount (e.g., 0.6 bar).

Line segment 402 shows that brake line pressure increases proportionately with increasing brake pedal application force after an initial brake pedal application force offset F1 until force F2 is reached (affine relationship). Between force brake pedal application force F1 and brake pedal application force F2, the brake booster working chamber pressure is below atmospheric pressure and the brake booster vacuum chamber is at the available vacuum level (e.g., 0.6 bar). At force F2, the brake booster saturates in its ability to assist applying vehicle brakes since the available vacuum is applied to the brake booster and since the brake booster working chamber pressure has reached atmospheric pressure. Since no additional vacuum is available and since atmospheric pressure is the brake booster working chamber pressure limit, any further increase in brake line fluid pressure results solely from increasing brake pedal application force and not vacuum assist.

Between brake pedal application forces F2 and F3, brake line fluid pressure increases at a slower rate with respect to brake pedal application force than brake line fluid pressure increased with respect to brake pedal application force before brake pedal application force F2 was reached. Line segment 404 illustrates that the rate of increase in brake line fluid pressure decreases as compared to brake line fluid pressure at line segment 402. Brake booster working chamber vacuum is less than or equal to zero (e.g., atmospheric pressure) and brake booster vacuum chamber pressure is at the available vacuum level. When brake line fluid pressure rate of increase is reduced with respect to an increase in brake pedal application force as indicated by line segment 404, the driver may notice that the braking force is being reduced for a same rate of brake pedal application force. Consequently, the driver may take notice and object to the way the vehicle brakes are being applied. Further, the brake pedal does not travel as far for a given increase in brake pedal application force since vacuum is not assisting the brake pedal application force to increase brake line fluid pressure. Thus, braking performance may degrade during conditions between brake pedal application force F2 and brake pedal application force F3.

At brake pedal application force F3, a hydraulic pump is activated and brake line fluid pressure increases in a stepwise fashion. The hydraulic pump and hydraulic brake assist is not active before brake pedal application force reaches force F3. By increasing the brake line fluid pressure in a stepwise fashion after brake line fluid pressure rate of increase has been reduced, it may be possible to increase vehicle stopping force. However, the stepwise change in braking force may be objectionable to the driver. Thus, the operating characteristics shown in FIG. 4 may be less than desirable.

Referring now to FIG. 5, operating characteristics of the vehicle braking method of FIG. 6 are shown. The plot in FIG. 5 is referenced to the same coordinates as the plot of FIG. 4. Therefore, for the sake of brevity a description of the plot axis is omitted. The conditions of FIG. 5 are substantially the same conditions as for FIG. 4.

In this example, brake line fluid pressure begins to increase at brake pedal application force F1, and the rate of brake line fluid pressure increase between brake pedal application force F1 and brake pedal application force F2, is the same rate as shown in FIG. 4. Namely, the rate of brake line fluid pressure increase is shown via the same line segment 402 as is shown in FIG. 4.

At brake pedal application force F2, output from a hydraulic pump is applied to vehicle brakes and the rate of brake line fluid pressure increase is maintained beyond brake pedal application force F2. Dashed line segment 502 represents the brake pedal application force where output of a hydraulic pump assists the driver to apply vehicle brakes at a rate that is the same per unit of brake pedal application force increase as before brake pedal application force F2 is reached. Thus, the brake line fluid pressure to brake pedal application force is a linear relationship that has a substantially constant slope (e.g., within ±10% of the original rate of change in brake line fluid pressure). By operating the hydraulic pump to assist the driver applying vehicle brakes, it may be possible to reduce or eliminate the reduction in brake line fluid pressure after the brake booster working chamber vacuum reaches atmospheric pressure. Further, although brake pedal feel may stiffen since further brake booster assistance is not available, the rate of braking increase with brake pedal application force may be maintained so that vehicle braking performance seems the same to the driver.

Referring now to FIG. 6, a method for operating vehicle brakes is shown. The method of FIG. 6 may be stored as executable instructions in non-transitory memory of a braking system as shown in FIGS. 1-3. Further, the method of FIG. 6 may provide the operating characteristics shown in FIG. 5.

At 602, method 600 judges whether or not vehicle brakes are applied. In one example, method 600 determines vehicle brakes are applied in response to sensed brake position. In other examples, method 600 judges that brakes are applied in response to a brake application force. If method 600 judges that brakes are applied, the answer is yes and method 600 proceeds to 606. Otherwise, the answer is no and method 600 proceeds to exit.

At 606, method 600 determines brake booster vacuum levels. If the brake booster includes a vacuum chamber that is at the pressure in the vacuum reservoir, method 600 may use the vacuum measured at 604 for the brake booster. In some examples, brake booster vacuum level may be determined from a pressure sensor that is exposed to the brake booster vacuum chamber. Method 600 also determines the vacuum level in the working chamber of the brake booster. Vacuum level in the brake booster working chamber is determined via sampling pressure in the working chamber. If pressure is less than atmospheric pressure, the brake booster working chamber is a vacuum. Method 600 proceeds to 608 after brake booster vacuum levels are determined.

At 608, method 600 determines brake line fluid pressures. To compute the brake pedal force, the master cylinder pressure is used (combined with pneumatic forces). In the case that the hydraulic pump is deployed, other hydraulic pressure measurements (e.g., from sensors) are used to establish the target brake line or wheel cylinder pressures. Method 600 proceeds to 610 after brake line fluid pressures are determined.

At 610, method 600 determines hydraulic force applied by the master cylinder. Hydraulic force from the master cylinder is determined by adding the oil pressures output from the master cylinder as determined at 608, and multiplying the result by the master cylinder piston area. Method 600 proceeds to 612 after hydraulic force from the master cylinder is determined.

At 612, method 600 determines pneumatic force applied by the brake booster to the master cylinder. In one example, method 600 subtracts brake booster working chamber vacuum level from vacuum chamber vacuum level and multiplies the result by the brake booster diaphragm area to determine pneumatic force applied by the brake booster to the master cylinder. Method 600 proceeds to 614 after pneumatic force is determined.

At 614, method 600 determines a brake pedal to rod force multiplication factor. The brake pedal to rod force multiplication factor is a constant that is determined by the mechanical linkage between the brake pedal and the actuator rod that passes through to the brake booster and master cylinder. For example, in one example, the rod force multiplication factor is 2, thereby doubling the force applied to the brake pedal to the actuator rod. Further, the brake booster return spring may be determined to be a constant force multiplied by the distance the spring is compressed. Method 600 proceeds to 616 after the brake pedal to rod force multiplication factor is determined.

At 616, method 600 determines brake pedal force. In examples where a brake pedal force sensor is available, the brake pedal force sensor output is converted into a brake pedal force. In other examples, brake pedal force is determined by summing the hydraulic force, the pneumatic force, and the brake booster return spring force and dividing the result by the brake pedal to rod force multiplication factor. Method 600 proceeds to 618 after brake pedal force is determined.

At 618, method 600 determines the brake pedal force to brake line fluid pressure relationship. In one example, a line or function is produced by storing pairs of brake line fluid pressure and brake pedal application force as determined at 616 and 608. The equation of a line is determined from the pairs. For example, if the brake line fluid pressure to brake pedal application force relationship is a straight line as in FIG. 5, it may be expressed as y=mx+b where m is the slope, y is the brake line fluid pressure, and x is the brake pedal application force. The values of m may be solved as $y_2-y_1/x_2-x_1$, where $y_2$ and $x_2$ are brake line fluid pressure and brake pedal application force at a second condition, and where $y_1$ and $x_1$ are brake line fluid pressure and brake pedal application force at a second condition. The value of b is solved via plugging an x–y pair into the equation of the straight line (y=mx+b). Method 600 proceeds to 620 after the brake line fluid pressure to brake pedal application force relationship is determined.

Based on pedal force, a target break line (or wheel cylinder pressure) is computed. That target pressure is requested of the hydraulic control system (consisting of valves, pumps, and electronic control).

At 620, method 600 judges whether or not vacuum in the brake booster working chamber is within a threshold pressure of atmospheric pressure. Vacuum in the brake booster working chamber decreases and vacuum in the vacuum chamber remains at an available vacuum level (e.g., vacuum level in the vacuum reservoir) as the driver depresses the brake pedal. The vacuum decrease in the brake booster working chamber allows the brake booster diaphragm to move toward the brake booster vacuum chamber, thereby moving the rod and increasing oil pressure in the master cylinder. If vacuum in the brake booster working chamber is within a threshold pressure of atmospheric pressure, the answer is yes and method 600 proceeds to 622. Otherwise, the answer is no and method 600 proceeds to exit.

If method 600 proceeds to exit, vehicle brakes are applied solely via brake pedal application force and vacuum or pneumatic assistance. Hydraulic brake assistance or pressurizing the brake booster working chamber are not applied if the brake booster working chamber pressure is not within a threshold range of atmospheric pressure.

At 622, method 600 adjusts hydraulic pump output fluid pressure to extend the brake line fluid pressure and brake pedal application force relationship. In one example where the brake booster working chamber may be exposed to a first high pressure air source (e.g., atmospheric pressure) and air pressure from a second high pressure air source (e.g., output of a pump or compressor), a valve regulating air flow from the second high pressure air source is opened in response to increasing brake pedal application force to increase brake line fluid pressure at the same rate as when the brake pedal is applied and only the first high pressure air source is in pneumatic communication with the brake booster working chamber. In this way, the brake line fluid pressure to brake pedal application force relationship may be maintained at a same rate. If the brake system includes only a single high pressure pneumatic source and brake booster working chamber pressure is within a threshold pressure of the single high pressure pneumatic source or if the brake system includes a second high pressure pneumatic source and brake booster working chamber pressure is within a threshold pressure of the second high pressure pneumatic source, the brake line fluid pressure to brake line application force relationship is maintained to increase brake line fluid pressure in response to brake pedal applied pressure via a hydraulic pump.

The hydraulic pump output fluid pressure is increased to the pressure of fluid output by the master cylinder just before the brake booster working chamber vacuum is depleted to atmospheric pressure or brake booster working chamber is within a threshold range of the highest pneumatic source pressure. In some examples, normally closed valves are opened (e.g., 243 of FIG. 2) to isolate master cylinder output from hydraulic pump output. Fluid from the master cylinder is fed to the hydraulic pump, and the hydraulic pump increases brake line fluid pressure supplied to vehicle brakes as brake pedal application force increases. In particular, the brake line fluid pressure is increased based on the brake line fluid pressure to brake pedal application force relationship determined at 618. For every incremental increase in brake pedal application force, brake line fluid pressure is increased solely via the hydraulic pump. The hydraulic pump increases its output pressure based on the brake pedal application force and the brake line fluid pressure to brake pedal application force relationship (e.g., as expressed by y=mx+b). The brake pedal and brake booster no longer directly supplies force to pressurize brake line fluid pressure. Rather, output from the hydraulic pump provides increasing brake line fluid pressure from conditions where the brake pedal application force is increasing and where the brake booster working chamber vacuum is decreased to within a threshold pressure of atmospheric pressure. If brake pedal application force decreases but brake booster working chamber vacuum is still within a threshold pressure of atmospheric pressure, hydraulic pump output oil pressure is decreased so as to follow the brake line fluid pressure to brake pedal application force relationship determined at 618. In one example, the brake line fluid pressure to brake pedal application force relationship is the equation of lines 402 and 502 of FIG. 5 and brake line fluid pressure is extended as indicated by line 502.

Additionally, method 600 may supply pressurized air to the brake booster working chamber via opening a valve between a compressor and the brake booster working chamber. The compressed air pushes the brake booster diaphragm toward the brake booster vacuum chamber to increase brake booster output. During such conditions, output from the hydraulic pump may not be increased until the brake booster working chamber reaches a predetermined pressure.

At 624, method 600 judges whether or not brake booster vacuum is increasing or if brake booster working chamber vacuum is increasing. Brake booster working chamber vacuum increases as the brake pedal application force is reduced to less than a threshold level. Brake booster vacuum may increase if engine intake manifold vacuum increases or if an ejector provides a lower level of vacuum. Brake booster supply vacuum may be determined via a sensor in the vacuum reservoir or via measuring vacuum in the brake booster vacuum chamber. Brake booster working chamber vacuum may be determined via sensing vacuum in the brake booster working chamber. If method 600 judges that the brake booster available vacuum or brake booster working chamber vacuum is increasing, the answer is yes and method 600 proceeds to 626. Otherwise, the answer is no and method 600 exits.

At 626, method 600 reduces hydraulic pump pressure output as available vacuum or brake booster working chamber vacuum increases. In one example if master cylinder fluid output pressure is not isolated via a valve from hydraulic pump output, hydraulic pump output pressure is decreased proportionately with an increase in the amount of available vacuum. By decreasing the hydraulic pump output as available vacuum increases, it may be possible to reduce the possibility of undesirable change in brake line fluid pressure. Additionally, if brake booster working chamber vacuum is increasing (e.g., in response to partially releasing the brake pedal), hydraulic pump output pressure may be decreased so that the brake line fluid pressure to brake pedal application force relationship may be maintained. Method 600 reduced hydraulic pump output pressure in response to an increase in brake booster vacuum or an increase in available vacuum and exits.

Thus, the method of FIG. 6 provides for a method for applying vehicle brakes, comprising: increasing a brake line fluid pressure in response to brake pedal force at a first rate while brake booster vacuum is less than a reservoir vacuum; and increasing the brake line fluid pressure at the first rate while brake booster working chamber vacuum is within a threshold pressure of atmospheric pressure. The method includes where the brake line fluid pressure is increased via a hydraulic pump while brake booster working chamber vacuum is within a threshold pressure of atmospheric pressure. The method includes where brake line fluid pressure is not increased further via vacuum while brake booster working chamber vacuum is at atmospheric pressure.

In some example, the method further comprises reducing a rate of increase in output pressure from the hydraulic pump in response to increasing reservoir vacuum. The method includes where the brake line fluid pressure is increased via vacuum while brake booster vacuum is not equal to atmospheric pressure. The method includes where the brake pedal force is estimated from hydraulic force, pneumatic force, and spring force. The method also includes where the reservoir is within the brake booster. The method includes where brake booster vacuum is vacuum in a brake booster vacuum chamber. The method further comprises increasing a pressure in a brake booster working chamber to a pressure greater than barometric pressure in response to brake booster working chamber vacuum being within a threshold pressure of atmospheric pressure.

The method of FIG. 6 also provides for a method for applying vehicle brakes, comprising: increasing a brake line fluid pressure to a first pressure with vacuum assistance, the brake line fluid pressure increased at a first rate proportionate with brake pedal applied force up to the first pressure; and increasing the brake line fluid pressure to a second pressure greater than the first pressure, beginning at the first pressure (e.g., the brake line fluid pressure at brake pedal application force F2 of FIG. 5), without additional vacuum assistance and at the first rate via hydraulic pump assistance, the brake line fluid pressure increased to the second pressure via hydraulic pump assistance in response to a brake booster working chamber vacuum level being substantially equal (e.g., within ±10% of atmospheric pressure) to or greater than atmospheric pressure.

The method of FIG. 6 also provides for reducing hydraulic pump assistance in response to an increase in vacuum reservoir vacuum. The method includes where hydraulic pump assistance is not provided while brake line fluid pressure is less than the first pressure. The method further comprises increasing a pressure in a brake booster working chamber to greater than barometric pressure in response to the brake booster working chamber vacuum level being within a threshold pressure of atmospheric pressure. The method includes where the brake pedal force is estimated from hydraulic force, pneumatic force, and spring force.

As will be appreciated by one of ordinary skill in the art, the methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. In addition, the terms aspirator or venturi may be substituted for ejector since the devices may perform in a similar manner.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for applying vehicle brakes, comprising:
increasing a brake line fluid pressure via a vacuum source in response to a brake pedal force at a first rate while a brake booster working chamber vacuum is a threshold pressure away from an atmospheric pressure; and
increasing the brake line fluid pressure at the first rate via an air pump positioned along a pneumatic line between a brake booster and a vacuum reservoir in response to the brake pedal force while the brake booster working chamber vacuum is within the threshold pressure of the atmospheric pressure, where the air pump increases the brake booster working chamber pressure above the atmospheric pressure.

2. The method of claim 1, further operating a valve to supply air from the air pump to a brake booster working chamber in response to the brake booster working chamber vacuum being within the threshold pressure of the atmospheric pressure.

3. The method of claim 1, further comprising increasing the brake line fluid pressure via a hydraulic pump in response to the brake booster working chamber vacuum at a predetermined pressure, where the brake line fluid pressure is not increased further via vacuum while the brake booster working chamber vacuum is at the atmospheric pressure.

4. The method of claim 3, further comprising reducing a rate of increase in an output pressure from the hydraulic pump in response to increasing a reservoir vacuum.

5. The method of claim 1, where the brake line fluid pressure is increased via the vacuum source while the brake booster working chamber vacuum is not equal to the atmospheric pressure, and further comprising:
a check valve positioned along the pneumatic line between the air pump and the vacuum reservoir.

6. The method of claim 1, where the brake pedal force is estimated from a hydraulic force, a pneumatic force, and a spring force.

7. The method of claim 2, where the air pump is pneumatically coupled to the valve.

8. The method of claim 1, where the air pump is in pneumatic communication with the vacuum reservoir.

9. The method of claim 8, further comprising increasing a pressure in a brake booster working chamber to greater than barometric pressure in response to the brake booster working chamber vacuum being within the threshold pressure of the atmospheric pressure.

10. A method for applying vehicle brakes, comprising:
increasing a brake line fluid pressure to a first pressure with a vacuum assistance, the brake line fluid pressure increased at a first rate proportionate with a brake pedal applied force up to the first pressure; and
increasing the brake line fluid pressure to a second pressure greater than the first pressure via opening a valve in response to a brake booster working chamber vacuum being within a threshold pressure of atmospheric pressure, the valve opened to supply air exhausted from a vacuum pump to a brake booster working chamber, the valve positioned along a pneumatic line between a brake booster and the vacuum pump.

11. The method of claim 10, further comprising increasing hydraulic pump output in response to the brake booster working chamber vacuum and reducing the hydraulic pump output in response to an increase in a vacuum of a vacuum reservoir.

12. The method of claim 11, where the hydraulic pump output is not provided while the brake line fluid pressure is less than the first pressure.

13. The method of claim 11, further comprising increasing a third pressure in the brake booster working chamber to greater than barometric pressure via a high pressure pneumatic source in response to the brake booster working chamber vacuum being within the threshold pressure of atmospheric pressure.

14. The method of claim 13, further comprising a check valve positioned along the pneumatic line between the vacuum pump and the vacuum reservoir and increasing the brake line fluid pressure in response to the brake pedal applied force increasing and the brake booster working chamber vacuum being within a threshold pressure of the high pressure pneumatic source.

15. A system for applying vehicle brakes, comprising:
vehicle brakes;
a brake pedal;
a vacuum brake booster coupled to the brake pedal and in fluidic communication with the vehicle brakes;
an air pump in pneumatic communication with a vacuum chamber of the vacuum brake booster via a vacuum reservoir separate from the vacuum brake booster, the air pump in pneumatic communication with a working chamber of the vacuum brake booster via a valve, the valve positioned along a pneumatic line between the air pump and the working chamber, the air pump positioned along the pneumatic line between the valve and the vacuum reservoir;
a hydraulic brake pump in fluidic communication with the vehicle brakes; and
a controller including executable instructions stored in a non-transitory memory to open the valve in response to brake booster working chamber vacuum being within a threshold pressure of atmospheric pressure, and further instructions to increase an output from the hydraulic brake pump in response to applying the brake pedal.

16. The system of claim 15, where the output from the hydraulic brake pump is increased in response to the brake booster working chamber vacuum being within the threshold pressure of atmospheric pressure, and where the valve is in pneumatic communication with atmospheric pressure.

17. The system of claim 15, further comprising additional instructions to reduce the output from the hydraulic brake pump in response to increasing vacuum in the vacuum reservoir, and further instructions to increase a pressure in the working chamber of the vacuum brake booster above atmospheric pressure via the air pump.

18. The system of claim 17, further comprising additional instructions to estimate a brake pedal force from a hydraulic force, a pneumatic force, and a spring force.

19. The system of claim 18, further comprising additional instructions to estimate a rate the vacuum brake booster assists increasing brake line fluid pressure.

20. The system of claim 15, further comprising a brake pedal force sensor, and where the output from the hydraulic brake pump is adjusted in response to an output from the brake pedal force sensor.

* * * * *